US012771469B2

(12) United States Patent
Takemura

(10) Patent No.: US 12,771,469 B2
(45) Date of Patent: Oct. 20, 2026

(54) OPTICAL TRANSMISSION SYSTEM AND OPTICAL TRANSMISSION METHOD

(71) Applicant: NEC Corporation, Tokyo (JP)

(72) Inventor: Takeshi Takemura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 243 days.

(21) Appl. No.: 18/705,077

(22) PCT Filed: Mar. 25, 2022

(86) PCT No.: PCT/JP2022/014576
§ 371 (c)(1),
(2) Date: Apr. 26, 2024

(87) PCT Pub. No.: WO2023/181388
PCT Pub. Date: Sep. 28, 2023

(65) Prior Publication Data
US 2025/0047405 A1 Feb. 6, 2025

(51) Int. Cl.
*H04J 14/02* (2006.01)
*H04B 10/079* (2013.01)

(52) U.S. Cl.
CPC ........ *H04J 14/0221* (2013.01); *H04B 10/079* (2013.01)

(58) Field of Classification Search
None
See application file for complete search history.

(56) References Cited

U.S. PATENT DOCUMENTS

| | | | | |
|---|---|---|---|---|
| 9,531,496 B2 * | 12/2016 | Yuki | H04J 14/0212 | |
| 10,056,976 B2 * | 8/2018 | Satou | H04J 14/00 | |
| 10,505,660 B2 * | 12/2019 | Yamamoto | H04B 10/032 | |
| 10,680,738 B2 * | 6/2020 | Inoue | H04J 14/0201 | |
| 11,115,128 B2 * | 9/2021 | Ootaki | H04J 14/0221 | |
| 2014/0286635 A1 * | 9/2014 | Kaneko | H04B 10/0799 | 398/34 |
| 2015/0093111 A1 * | 4/2015 | Wang | H04J 14/02216 | 398/48 |

(Continued)

FOREIGN PATENT DOCUMENTS

| | | |
|---|---|---|
| JP | 2005-049242 A | 2/2005 |
| JP | 2019-517169 A | 6/2019 |

(Continued)

OTHER PUBLICATIONS

International Search Report for PCT Application No. PCT/JP2022/014576, mailed on Jun. 21, 2022.

(Continued)

*Primary Examiner* — Jai M Lee

(57) ABSTRACT

An optical transmission system that includes a first optical device including a first optical signal adjustment unit that adjust light intensity of an input light signal for each wavelength, and a first control unit that controls the first optical signal adjustment unit; and a second optical device including a second control unit. The second control unit sends, to the first control unit, transmitted light information being information relating to a transmitted light signal, and the first control unit controls the first optical signal adjustment unit in such a way that the transmitted light signal is allowed to pass by using the transmitted light information.

10 Claims, 8 Drawing Sheets

(56) References Cited

U.S. PATENT DOCUMENTS

| | | | | |
|---|---|---|---|---|
| 2019/0052356 | A1* | 2/2019 | Inoue ................ | H04J 14/02216 |
| 2023/0344543 | A1* | 10/2023 | Yamazaki ........ | H04B 10/07955 |

FOREIGN PATENT DOCUMENTS

| | | | |
|---|---|---|---|
| WO | 2017/154454 | A1 | 9/2017 |
| WO | 2019/116776 | A1 | 6/2019 |
| WO | 2021/070565 | A1 | 4/2021 |

OTHER PUBLICATIONS

English translation of Written opinion for PCT Application No. PCT/JP2022/014576, mailed on Jun. 21, 2022.

* cited by examiner

OPTICAL TRANSMISSION SYSTEM AND OPTICAL TRANSMISSION METHOD

This application is a National Stage Entry of PCT/JP2022/014576 filed on Mar. 25, 2022, the contents of all of which are incorporated herein by reference, in their entirety.

TECHNICAL FIELD

The present invention relates to an optical transmission system and an optical transmission method, and particularly relates to an optical transmission system and an optical transmission method that are used together with an optical submarine cable system.

BACKGROUND ART

An optical submarine cable system connecting between continents by an optical fiber plays an important role, as an infrastructure for supporting an international communication network. The optical submarine cable system is constituted of a submarine cable accommodating an optical fiber, a submarine repeater on which an optical amplifier is loaded, a submarine branching device branching an optical signal, a terminal station device installed in a cable landing station, and the like. One example of an optical submarine cable system as described above is described in PTL 1.

CITATION LIST

Patent Literature

PTL 1: Japanese Unexamined Patent Application Publication (Translation of PCT Application) No. 2019-517169

SUMMARY OF INVENTION

Technical Problem

In an optical submarine cable system, in recent years, an optical transmission system in which a usage wavelength band for one optical fiber is divided into a plurality of sub bands, and a different client (user) is allocated to each sub band has been paid attention.

Meanwhile, a communication traffic amount between large-scale data centers disposed all over the world tends to increase. With an increase in a communication traffic amount between data centers, an increase in delay and an increase in power consumption due to termination of an optical signal (optical path) in a cable landing station (CLS) has become a problem. In order to avoid a problem as described above, there is a demand for extending a termination point of an optical signal propagating through a submarine cable from a cable landing station (CLS) to a data center of a client or a connection point (point of presence: POP) with respect to a backbone network installed inland.

However, in this case, since an optical device installed in the cable landing station (CLS), and an optical device owned by a client at the data center or the POP are individual devices, it is necessary to individually control each of the optical devices. Therefore, complex control is required in order to achieve one function by associating the optical device installed in the cable landing station (CLS) with the optical device installed at the POP or the like.

In this way, in an optical transmission system, there has been a problem in which control becomes complex when a termination point of an optical signal propagating through a submarine cable is extended.

An object of the present invention is to provide an optical transmission system and an optical transmission method that solve the above-described problem being a problem in which control becomes complex in an optical transmission system when a termination point of an optical signal propagating through a submarine cable is extended.

Solution to Problem

An optical transmission system according to the present invention includes a first optical device including a first optical signal adjustment means that adjusts light intensity of an input light signal for each wavelength, and a first control means that controls the first optical signal adjustment means, and a second optical device including a second control means, wherein the second control means sends, to the first control means, transmitted light information being information relating to a transmitted light signal, and the first control means controls the first optical signal adjustment means in such a way that the transmitted light signal is allowed to pass by using the transmitted light information.

An optical transmission method according to the present invention includes acquiring transmitted light information being information relating to a transmitted light signal; and allowing the transmitted light signal to pass by adjusting light intensity for each wavelength by using the transmitted light information.

Advantageous Effects of Invention

In an optical transmission system and an optical transmission method according to the present invention, control can be simplified in the optical transmission system even when a termination point of an optical signal propagating through a submarine cable is extended.

EXAMPLE EMBODIMENT

Hereinafter, example embodiments according to the present invention are described with reference to the drawings.

First Example Embodiment

Figure 1:
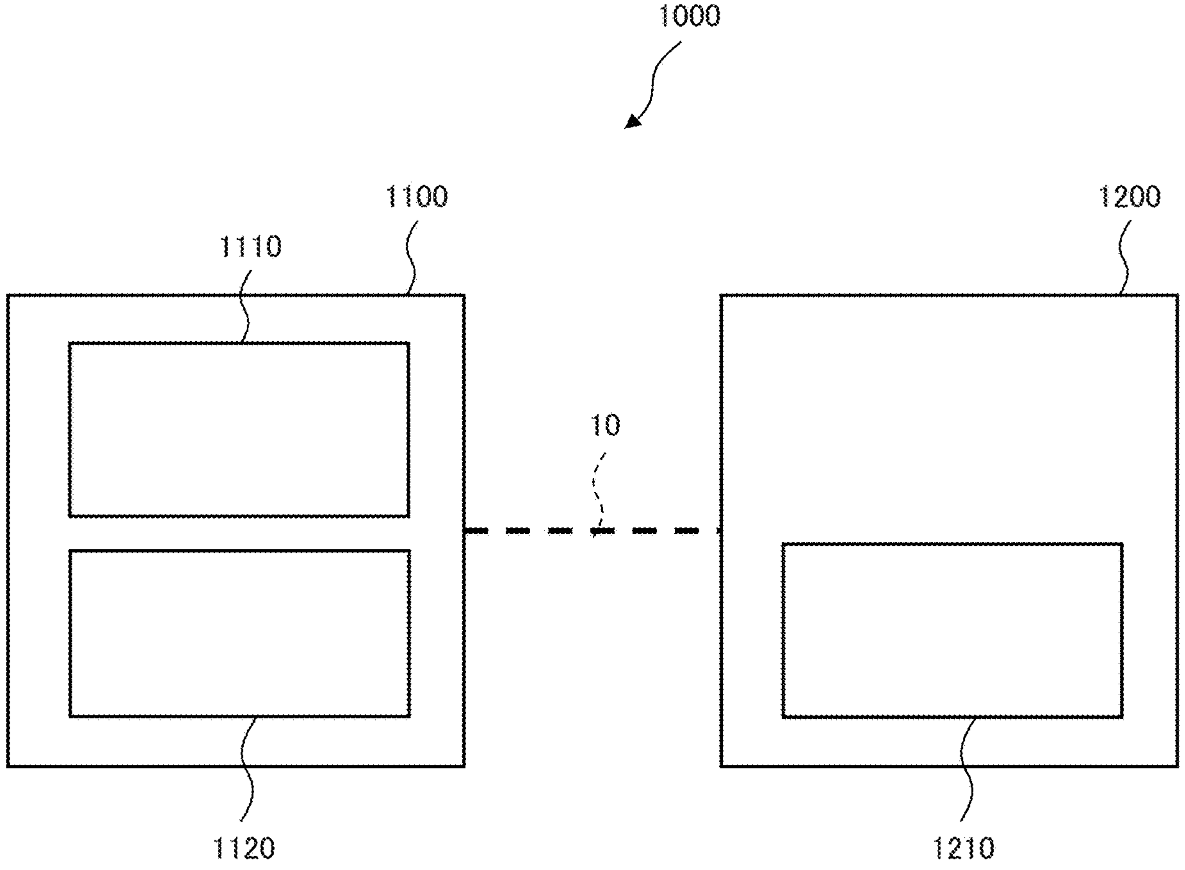
FIG. 1 is a block diagram illustrating a configuration of an optical transmission system according to a first example embodiment of the present invention.

FIG. 1 is a block diagram illustrating a configuration of an optical transmission system 1000 according to a first example embodiment of the present invention. The optical transmission system 1000 includes a first optical device 1100 and a second optical device 1200. The optical transmission system 1000 is preferably used together with an optical submarine cable system.

The first optical device 1100 includes a first optical signal adjustment unit (first optical signal adjustment means) 1110 and a first control unit (first control means) 1120. The first optical signal adjustment unit 1110 is configured in such a way as to adjust light intensity of an input light signal for each wavelength. The first control unit 1120 controls the first optical signal adjustment unit 1110.

The second optical device 1200 includes a second control unit (second control means) 1210.

Herein, the second control unit 1210 sends, to the first control unit 1120, transmitted light information being information relating to a transmitted light signal. Then, the first control unit 1120 controls the first optical signal adjustment unit 1110 in such a way that the transmitted light signal is allowed to pass by using the transmitted light information.

The first optical device 1100 is typically installed in a data center or at a connection point (point of presence: POP) with respect to a backbone network. Further, the second optical device 1200 is typically installed in a cable landing station (CLS) of an optical submarine cable system. In this case, a termination point of an optical signal propagating through a submarine cable can be extended to the data center or the POP.

When the first optical device 1100 and the second optical device 1200 are located away from each other as exemplified by a connection point (POP) and a cable landing station (CLS) or the like, control is required to be performed for each of the first optical device 1100 and the second optical device 1200. Therefore, complex control is required to achieve one function by associating the first optical device 1100 and the second optical device 1200 with each other.

Meanwhile, the optical transmission system 1000 according to the present example embodiment is configured in such a way that the second control unit 1210 sends transmitted light information to the first control unit 1120, and the first control unit 1120 controls the first optical signal adjustment unit 1110 in such a way as to allow a transmitted light signal to pass by using the transmitted light information. Therefore, only performing one operation of instructing the second optical device 1200 to start an operation enables to control in such a way that a transmitted light signal passes through the first optical device 1100, and is guided to the second optical device 1200. Specifically, in the optical transmission system 1000 according to the present example embodiment, control can be simplified in an optical transmission system, even when a termination point of an optical signal propagating through a submarine cable is extended.

Herein, the second control unit 1210 can be configured to send transmitted light information to the first control unit 1120 via an optical transmission path 10 through which a transmitted light signal propagates from the first optical device 1100 to the second optical device 1200. Specifically, the second control unit 1210 can be configured to send transmitted light information to the first control unit 1120 by an in-band method via the optical transmission path 10 through which a main optical signal is transmitted. Specifically, for example, it is possible to mount an optical transceiver on a port of a switching hub (Layer 2-switch) connected to each of the first optical device 1100 and the second optical device 1200, and send transmitted light information by these optical transceivers via the optical transmission path 10. As an optical transceiver in this case, typically, a small form-factor pluggable (SFP) module can be used.

The first optical signal adjustment unit 1110 can be configured to include a first connection port configured in such a way as to be connected to an optical transponder for generating a transmitted light signal, and a second connection port configured in such a way as to be connected to the optical transmission path 10 laid in land. As the first optical signal adjustment unit 1110, typically, a wavelength selectable switch (WSS) can be used. The wavelength selectable switch (WSS) is able to select a path of signal light for each wavelength, and includes a bandwidth variable function and an attenuation amount adjustment function. In this case, the first optical signal adjustment unit 1110 is allowed to pass a transmitted light signal by the bandwidth variable function and the attenuation amount adjustment function included in the wavelength selectable switch (WSS).

Transmitted light information may include at least a central wavelength and a bandwidth of a transmitted light signal, and a connection port number of the first optical signal adjustment unit 1110 to which the transmitted light signal is introduced. Herein, the second optical device 1200 acquires transmitted light information, for example, from a monitoring device (element management system: EMS) of station equipment in an optical submarine cable system.

Figure 2:
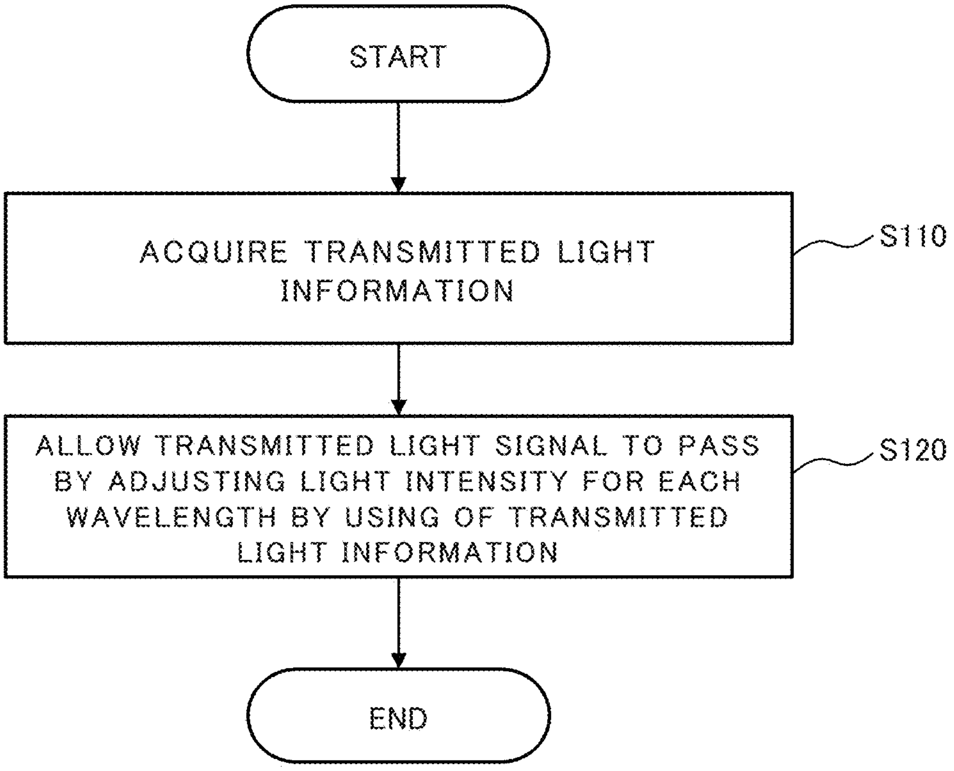
FIG. 2 is a flowchart for describing an optical transmission method according to the first example embodiment of the present invention.

Next, an optical transmission method according to the present example embodiment is described by using a flowchart illustrated in FIG. 2.

In the optical transmission method according to the present example embodiment, first, transmitted light information being information relating to a transmitted light signal is acquired (step S110). Then, the transmitted light signal is allowed to pass by adjusting light intensity for each wavelength with use of the transmitted light information (step S120).

In this way, the optical transmission method according to the present example embodiment is configured to acquire transmitted light information being information relating to a transmitted light signal, and allow the transmitted light signal to conduct by adjusting light intensity for each wavelength with use of the transmitted light information. Therefore, it is possible to allow a transmitted light signal to pass with a simple operation.

Acquiring the above-described transmitted light information may include acquiring transmitted light information via an optical transmission path through which a transmitted light signal propagates. Further, allowing the above-described transmitted light signal to pass includes receiving a transmitted light signal from an optical transponder, and sending the transmitted light signal to an optical transmission path laid in land. Herein, transmitted light information may include at least a central wavelength and a bandwidth of a transmitted light signal.

As described above, in the optical transmission system 1000 and the optical transmission method according to the present example embodiment, control can be simplified in an optical transmission system, even when a termination point of an optical signal propagating through a submarine cable is extended.

Second Example Embodiment

Figure 3:
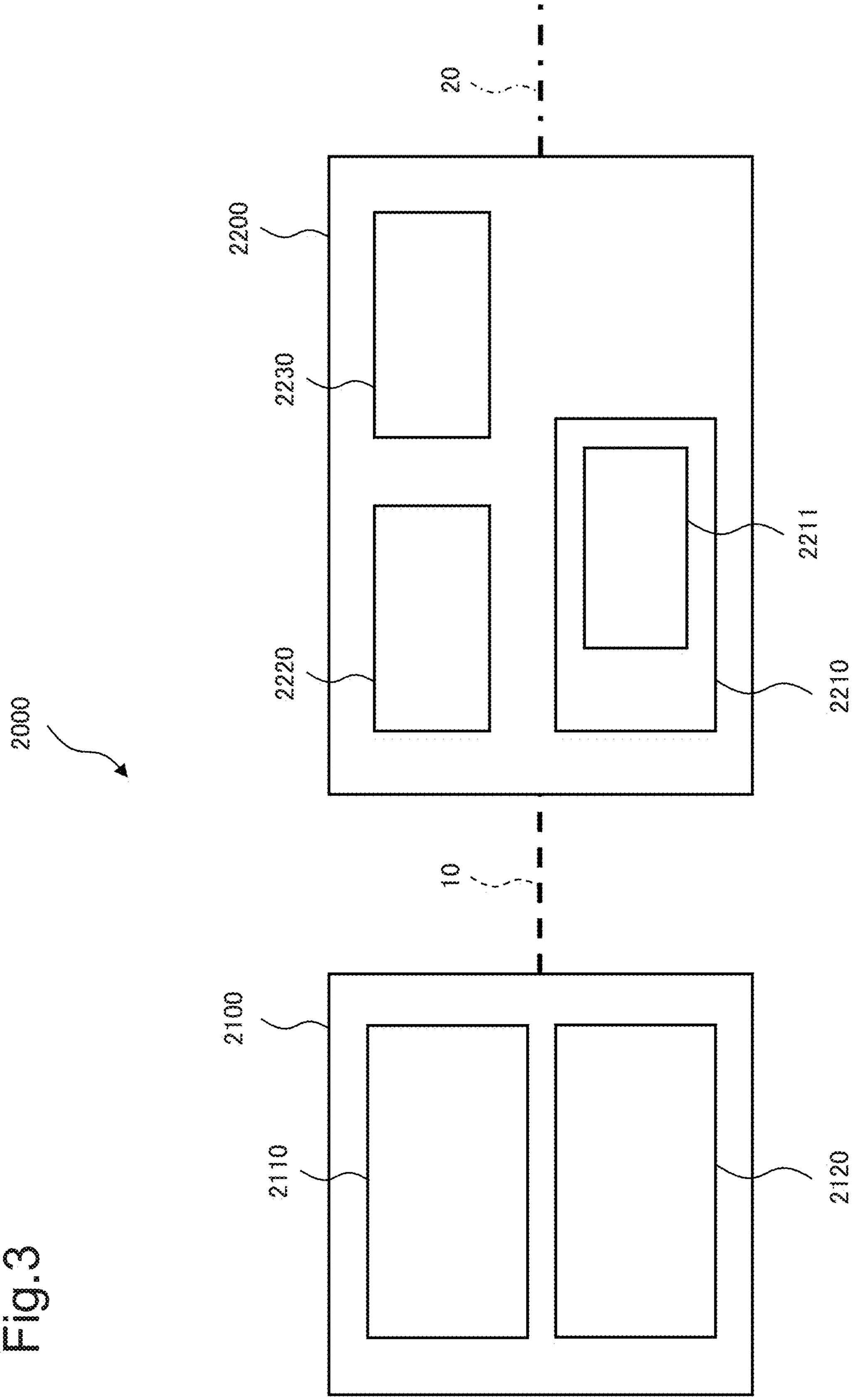
FIG. 3 is a block diagram illustrating a configuration of an optical transmission system according to a second example embodiment of the present invention.

Next, a second example embodiment according to the present invention is described. FIG. 3 illustrates a configuration of an optical transmission system 2000 according to a present example embodiment. The optical transmission system 2000 includes a first optical device 2100 and a second optical device 2200. The optical transmission system 2000 is preferably used together with an optical submarine cable system.

The first optical device 2100 includes a first optical signal adjustment unit (first optical signal adjustment means) 2110 and a first control unit (first control means) 2120. The first optical signal adjustment unit 2110 is configured in such a way as to adjust light intensity of an input light signal for each wavelength. The first control unit 2120 controls the first optical signal adjustment unit 2110.

The second optical device 2200 includes a second control unit (second control means) 2210. The second control unit 2210 sends, to the first control unit 2120, transmitted light information being information relating to a transmitted light signal. Then, the first control unit 2120 controls the first optical signal adjustment unit 2110 in such a way as to allow the transmitted light signal to pass by using the transmitted light information.

Herein, the second optical device 2200 acquires transmitted light information, for example, from a monitoring device (EMS) of station equipment in an optical submarine cable system.

The first optical device 2100 is typically installed in a data center or at a connection point (POP) with respect to a backbone network. Further, the second optical device 2200 is typically installed in a cable landing station (CLS) of an optical submarine cable system. In this case, a termination point of an optical signal propagating through a submarine cable can be extended to the data center or the POP.

A configuration so far is similar to the configuration of the optical transmission system 1000 according to the first example embodiment. In the optical transmission system 2000 according to the present example embodiment, the second optical device 2200 is configured to further include a dummy light generation unit (dummy light generation means) 2220 and a light monitor unit (light monitor means) 2230. Further, the second control unit 2210 is configured to include a storage unit (storage means) 2211.

The dummy light generation unit 2220 generates dummy light. As the dummy light generation unit 2220, for example, an amplified spontaneous emission (ASE) light source in which an amplifier (erbium doped fiber amplifier: EDFA) using an erbium doped fiber is set in a no-input signal state can be used.

The light monitor unit 2230 monitors light intensity of received input light for each wavelength, and generates light monitor information. As the light monitor unit 2230, typically, an optical channel monitor (OCM) can be used.

Figure 4:
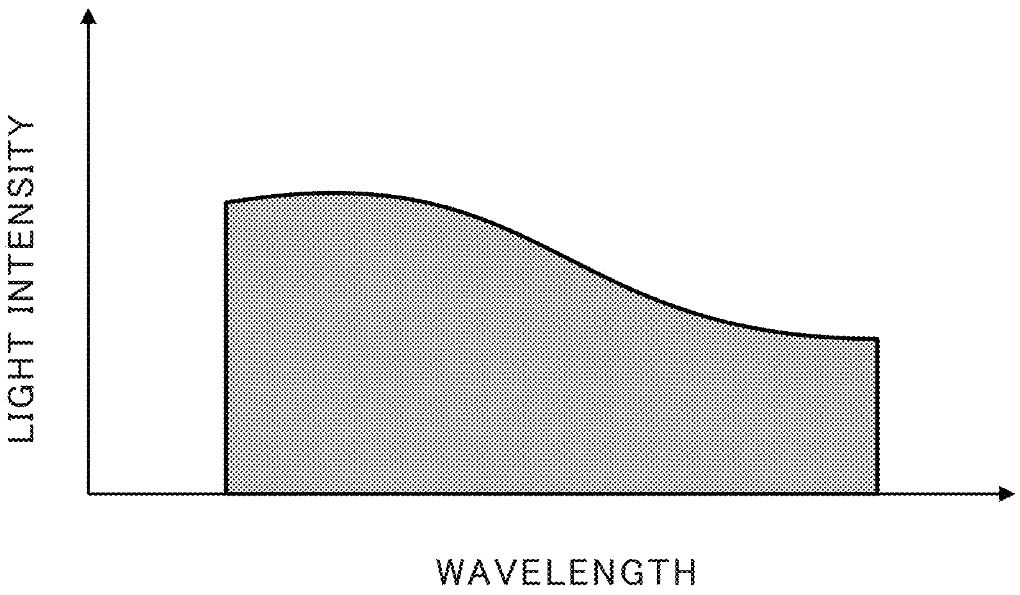
FIG. 4 is a diagram schematically illustrating light intensity setting information to be stored in a storage unit included in a second optical device constituting the optical transmission system according to the second example embodiment of the present invention.

The storage unit 2211 is configured to store light intensity setting information for compensating an optical transmission characteristic of a submarine optical transmission path 20 to which the second optical device 2200 is connected. The light intensity setting information is information relating to light intensity (pre-emphasis) being set in advance for each wavelength depending on wavelength dependence in such a way as to compensate the wavelength dependence of the light intensity in the submarine optical transmission path 20. One example of the light intensity setting information is schematically illustrated in FIG. 4. The storage unit 2211 is able to hold a value of light intensity with respect to each wavelength as described above, for example, in a table format. The second optical device 2200 is able to introduce dummy light to be generated by the dummy light generation unit 2220 to the submarine optical transmission path 20, and acquire light intensity setting information by measuring in advance wavelength dependence of light intensity in the submarine optical transmission path 20.

Next, an operation of the optical transmission system 2000 according to the present example embodiment is described.

The light monitor unit 2230 receives a transmitted light signal and dummy light, and generates first light monitor information being light monitor information. The second control unit 2210 sends, to the first control unit 2120, the first light monitor information and light intensity setting information via the optical transmission path 10. Then, the first control unit 2120 controls the first optical signal adjustment unit 2110 in such a way that light intensity of the transmitted light signal is made compatible with the light intensity setting information by using the first light monitor information.

As the first optical signal adjustment unit 2110, typically, a wavelength selectable switch (WSS) can be used. In this case, the first optical signal adjustment unit 2110 is able to make light intensity of a transmitted light signal compatible with light intensity setting information by an attenuation amount adjustment function included in the wavelength selectable switch (WSS).

Further, the second control unit 2210 can be configured to control the dummy light generation unit 2220 in such a way that light intensity of dummy light is made compatible with the light intensity setting information by using the first light monitor information.

Configuring as described above allows the first optical device 2100 to acquire light intensity setting information from the second optical device 2200. Therefore, the first optical device 2100 is able to make light intensity of a transmitted light signal compatible with light intensity setting information. Consequently, only allowing an external device such as a monitoring device (EMS) to perform one operation of instructing the second optical device 2200 to start an operation enables to achieve a function of automatically inserting a transmitted light signal compatible with light intensity setting information. Specifically, in the optical transmission system 2000 according to the present example embodiment, control can be simplified in an optical transmission system, even when a termination point of an optical signal propagating through a submarine cable is extended.

Figure 5:
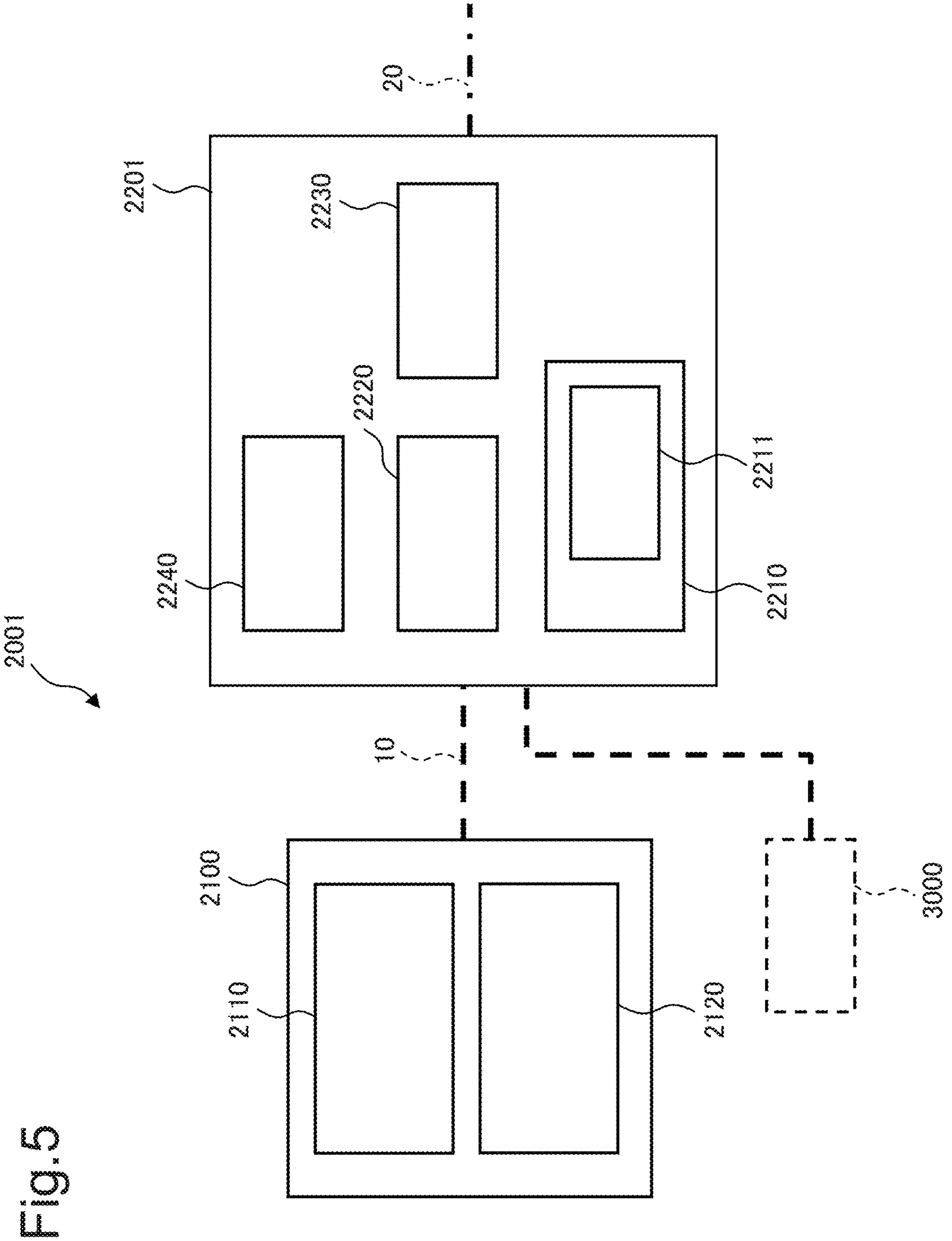
FIG. 5 is a block diagram illustrating another configuration of the optical transmission system according to the second example embodiment of the present invention.

FIG. 5 illustrates another configuration of the optical transmission system according to the present example embodiment. In an optical transmission system 2001, a second optical device 2201 is configured to further include a second optical signal adjustment unit (second optical signal adjustment means) 2240.

The second optical signal adjustment unit 2240 receives, from the first optical device 2100, a first transmitted light signal being the above-described transmitted light signal, and receives a second transmitted light signal from a third optical device 3000. Then, the second optical signal adjustment unit 2240 is configured to adjust and multiplex light intensity of each of the first transmitted light signal and the second transmitted light signal for each wavelength.

In this case, the light monitor unit 2230 receives a first transmitted light signal, a second transmitted light signal, and dummy light, and generates second light monitor information being the above-described light monitor information. Then, the second control unit 2210 controls the second optical signal adjustment unit 2240 in such a way that light intensity of each of the first transmitted light signal and the second transmitted light signal is made compatible with light intensity setting information by using the second light monitor information. Further, the second control unit 2210 can be configured to control the dummy light generation unit 2220 in such a way that light intensity of dummy light is made compatible with the light intensity setting information by using the second light monitor information.

Figure 6:
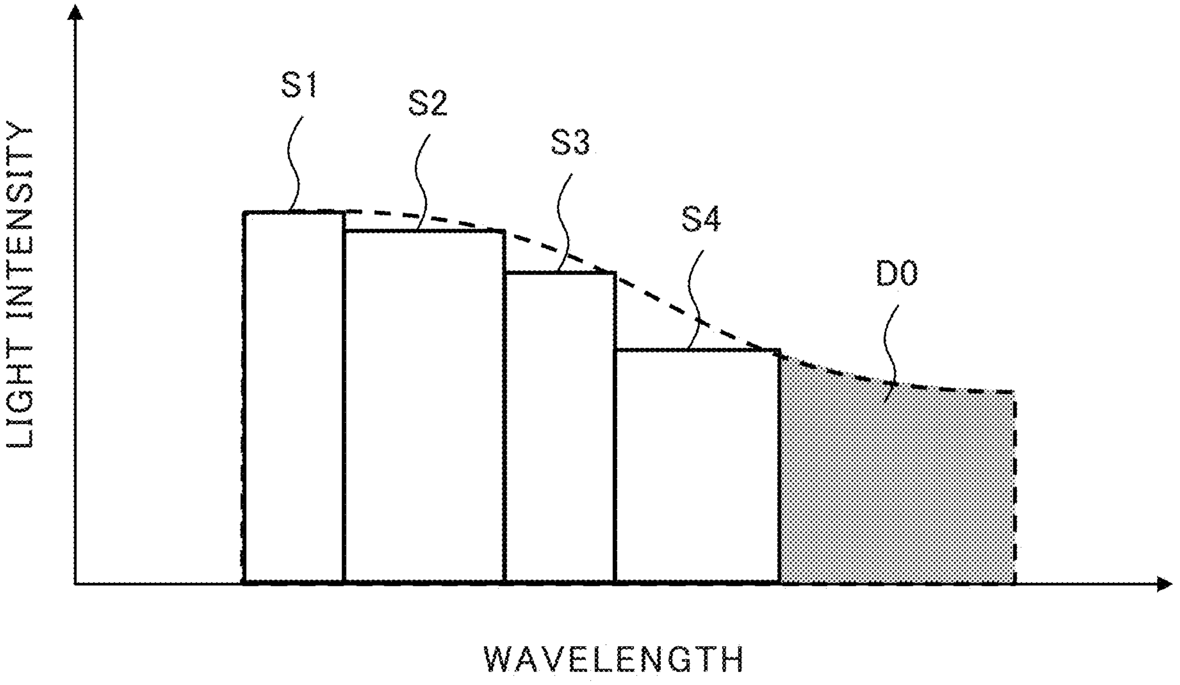
FIG. 6 is a diagram illustrating spectra of a wavelength multiplexed optical signal to be output from the second optical device constituting the optical transmission system according to the second example embodiment of the present invention.

FIG. 6 illustrates one example of spectra of a wavelength multiplexed optical signal to be output from the second optical device 2201. In FIG. 6, a case where a wavelength multiplexed optical signal includes four transmitted light signals S1, S2, S3, and S4, and dummy light D0 is illustrated as an example. A curve indicated by the broken line in FIG. 6 indicates light intensity setting information illustrated in FIG. 4. Using a wavelength multiplexed optical signal as described above enables to compensate wavelength dependence of light intensity in the submarine optical transmission path 20.

The second optical signal adjustment unit 2240 can be configured to include a third connection port configured in such a way as to be connected to the optical transmission path 10 laid in land, and a fourth connection port configured to be connected to the submarine optical transmission path 20. As the second optical signal adjustment unit 2240, typically, a wavelength selective switch (WSS) can be used. The wavelength selective switch (WSS) is able to select a path of signal light for each wavelength, and includes a bandwidth variable function and an attenuation amount adjustment function. The second optical signal adjustment unit 2240 is able to make light intensity of each of a first transmitted light signal and a second transmitted light signal compatible with light intensity setting information by the attenuation amount adjustment function included in the wavelength selective switch (WSS).

Herein, since the first optical device 2100 does not include a dummy light generation unit, it is not possible to measure in advance wavelength dependence of light intensity in the submarine optical transmission path 20. Therefore, it is difficult for the first optical device 2100 to acquire light intensity setting information by itself. Thus, the first optical device 2100 alone is not able to control the first optical signal adjustment unit 2110 in such a way that light intensity of a transmitted light signal is made compatible with light intensity setting information.

Meanwhile, since the second optical device 2201 is not able to receive a transmitted light signal by the light monitor unit 2230, unless the first optical signal adjustment unit 2110 is controlled in such a way as to allow the transmitted light signal to pass, the second optical device 2201 is not able to generate light monitor information. Therefore, in this case, the second optical device 2201 is not able to control the second optical signal adjustment unit 2240 in such a way that light intensity of a transmitted light signal is made compatible with light intensity setting information.

Therefore, in order to achieve a function of inserting a transmitted light signal for compensating wavelength dependence of the submarine optical transmission path 20, it is necessary to individually control the first optical device 2100 and the second optical device 2201. Thus, when the first optical device 2100 and the second optical device 2200 are located away from each other, as exemplified by a connection point (POP) and a cable landing station (CLS), complex control is required.

In contrast, in the optical transmission system 2001 according to the present example embodiment, the second control unit 2210 sends transmitted light information to the first control unit 2120, and the first control unit 2120 controls the first optical signal adjustment unit 2110 in such a way as to allow a transmitted light signal to pass by using the transmitted light information. Further, it is configured in such a way that the light monitor unit 2230 receives a transmitted light signal and generates light monitor information, and the second control unit 2210 controls the second optical signal adjustment unit 2240 in such a way that light intensity of the transmitted light signal is made compatible with the light intensity setting information by using the light monitor information. Therefore, only allowing an external device such as a monitoring device (EMS) to perform one operation of instructing the second optical device 2201 to start an operation enables to achieve a function of automatically inserting a transmitted light signal compatible with light intensity setting information.

Figure 7:
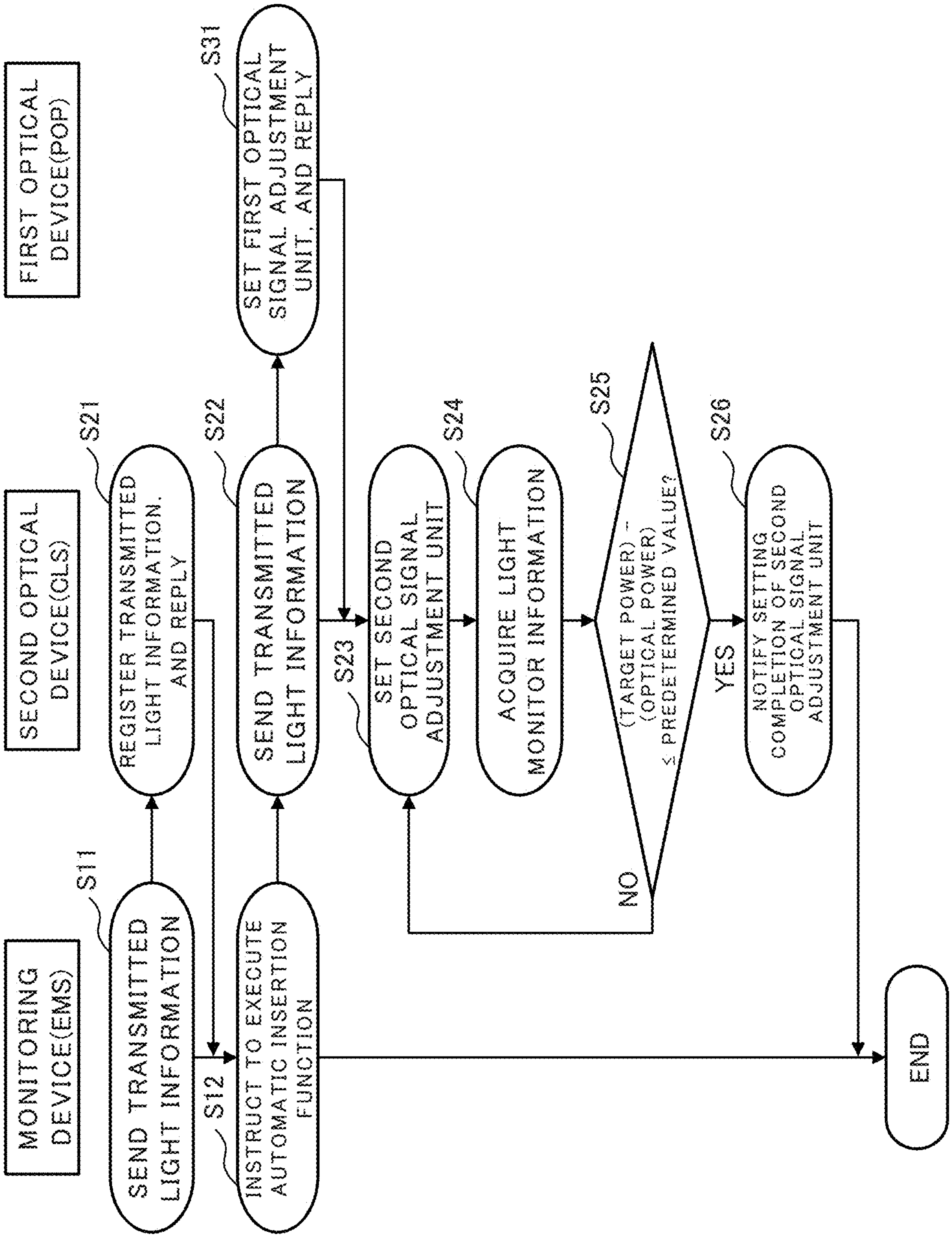
FIG. 7 is a sequence diagram for explaining an operation of the optical transmission system according to the second example embodiment of the present invention.

Next, an operation of the optical transmission system 2001 according to the present example embodiment is specifically described. FIG. 7 is a sequence diagram for describing an operation of the optical transmission system 2001 according to the present example embodiment.

First, the monitoring device (EMS) sends, to the second optical device (CLS), transmitted light information such as a central wavelength and a bandwidth of an optical transponder to be newly inserted into the first optical device (POP), and a connection port number of the first optical signal adjustment unit (WSS) (step S11). As the transmitted light information, an identification code (identification (ID) number) of a device for identifying the first optical device (POP), and an internet protocal (IP) address can be included.

The second optical device (CLS) registers the transmitted light information, and replies to the monitoring device (EMS) accordingly (step S21).

Next, the monitoring device (EMS) instructs the second optical device (CLS) to execute a function of automatically inserting a transmitted light signal (step S12). This allows the second optical device (CLS) to first send the transmitted light information to the first optical device (POP) (step S22). The first optical device (POP) sets the first optical signal adjustment unit (WSS) by using the transmitted light information, and replies to the second optical device (CLS) accordingly (step S31).

Subsequently, the second optical device (CLS) starts settings on the second optical signal adjustment unit (WSS) (step S23). First, the second optical device (CLS) acquires light monitor information by using the light monitor unit (OCM) (step S24). Then, it is determined whether a difference between optical power of the inserted optical transponder being included in the light monitor information, and target power by light intensity setting information is equal to or less than a predetermined value (step S25). Herein, the predetermined value can be set to, for example, ±5 decibel (dB).

When the difference between optical power and target power is not equal to less than the predetermine value (step S25/NO), the second optical device (CLS) adjusts an attenuation amount of the second optical signal adjustment unit (WSS), and sets again the second optical signal adjustment unit (WSS) (step S23). When the difference between optical power and target power is equal to less than the predetermined value (step S25/YES), the second optical device (CLS) completes settings on the second optical signal adjustment unit (WSS), and notifies the monitoring device (EMS) accordingly (step S26). Thus, an automatic insertion operation of a transmitted light signal by the optical transmission system 2001 according to the present example embodiment is finished.

By the foregoing operation, only allowing an external device such as the monitoring device (EMS) to perform one operation of instructing the second optical device (CLS) to start an operation enables to achieve a function of automatically inserting a transmitted light signal compatible with light intensity setting information. Specifically, in the optical transmission system 2001 according to the present example embodiment, control can be simplified in an optical transmission system, even when a termination point of an optical signal propagating through a submarine cable is extended.

Figure 8:
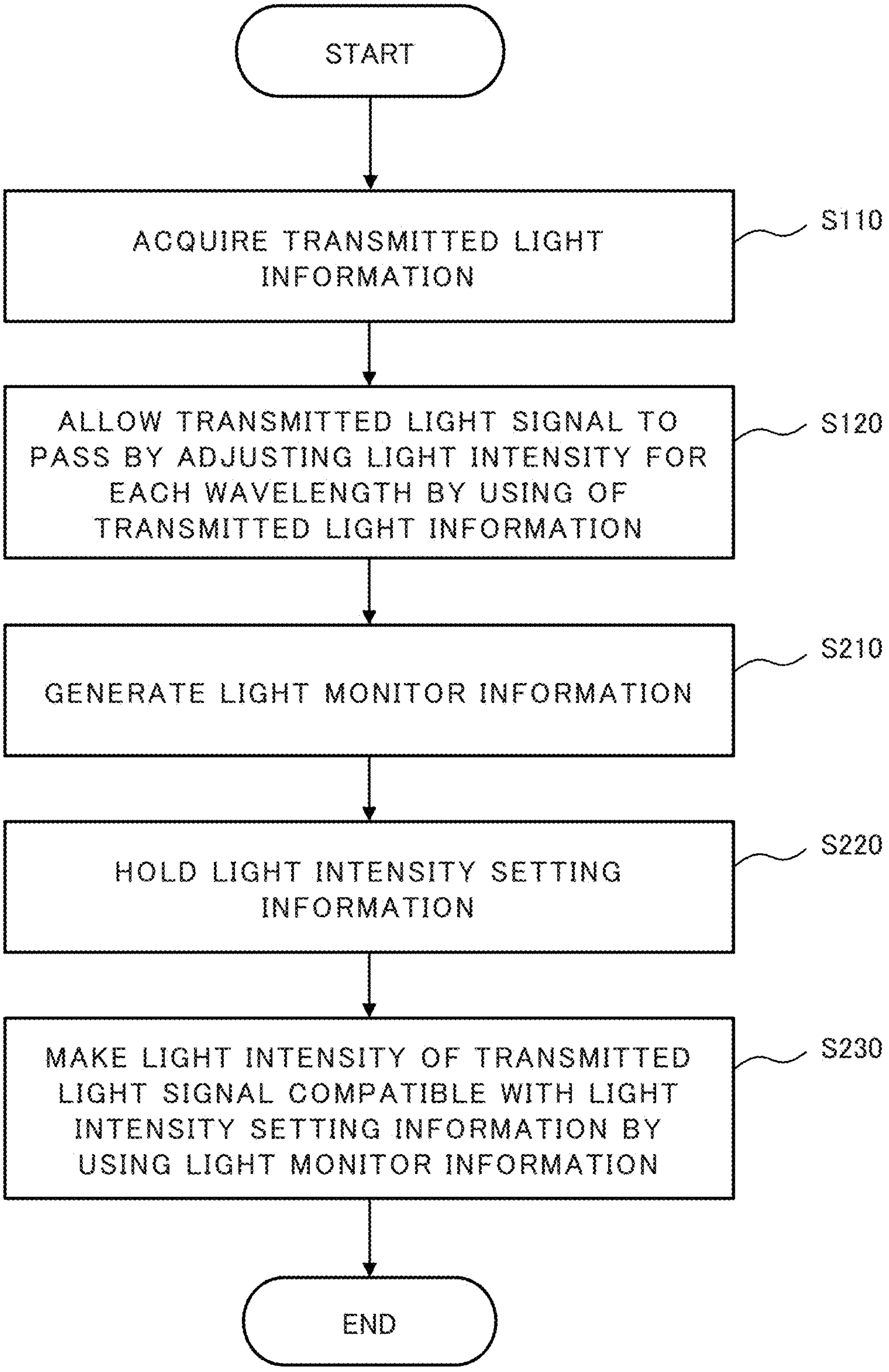
FIG. 8 is a flowchart for describing an optical transmission method according to the second example embodiment of the present invention.

Next, an optical transmission method according to the present example embodiment is described by using a flowchart illustrated in FIG. 8.

In the optical transmission method according to the present example embodiment, first, transmitted light information being information relating to a transmitted light signal is acquired (step S110). Then, the transmitted light signal is allowed to pass by adjusting light intensity for each wavelength by using the transmitted light information (step S120).

A configuration so far is similar to that of the optical transmission method according to the first example embodiment. In the optical transmission method according to the present example embodiment, light intensity of received light input is monitored for each wavelength, and light monitor information is generated (step S210). Further, light intensity setting information for compensating an optical transmission characteristic of a submarine optical transmission path through which a transmitted light signal propagates is held (step S220). Then, it is configured to further include making light intensity of the transmitted light signal compatible with the light intensity setting information by using the light monitor information (step S230).

Configuring as described above enables to achieve a function of automatically inserting a transmitted light signal compatible with light intensity setting information by simple control.

Herein, it can be configured to further include generating dummy light. In this case, generating the above-described light monitor information includes receiving a transmitted light signal and dummy light, and generating first light monitor information being light monitor information. Then, it can be configured to acquire the first light monitor information and light intensity setting information via an optical transmission path, and make light intensity of the transmitted light signal compatible with the light intensity setting information by using the first light monitor information. At this occasion, light intensity of dummy light may be made compatible with the light intensity setting information by using the first light monitor information.

Further, it may be configured in such a way that a first transmitted light signal being a transmitted light signal is received via an optical transmission path, a second transmitted light signal different from the first transmitted light signal is received, and light intensity of each of the first transmitted light signal and the second transmitted light signal is adjusted and multiplexed for each wavelength. Also in this case, it is possible to configure to further include generating dummy light. At this occasion, generating the above-described light monitor information includes receiving a first transmitted light signal, a second transmitted light signal, and dummy light, and generating second light monitor information being light monitor information. Further, it is possible to configure in such a way that light intensity of each of the first transmitted light signal and the second transmitted light signal is made compatible with light intensity setting information by using the second light monitor information. Furthermore, light intensity of dummy light may be made compatible with the light intensity setting information by using the second light monitor information.

Receiving the above-described first transmitted light signal may include receiving a first transmitted light signal via an optical transmission path laid in land. Further, it is possible to generate a multiplexed optical signal in which light intensity of each of a first transmitted light signal and a second transmitted light signal is adjusted and multiplexed for each wavelength, and send the multiplexed optical signal to a submarine optical transmission path.

As described above, in the optical transmission systems 2000 and 2001, and the optical transmission method according to the present example embodiment, control can be simplified in an optical transmission system, even when a termination point of an optical signal propagating through a submarine cable is extended.

A part or all of the above-described example embodiments may also be described as the following supplementary notes, but is not limited to the following.

(Supplementary note 1) An optical transmission system including:

a first optical device including a first optical signal adjustment means being configured in such a way as to adjust light intensity of an input light signal for each wavelength, and a first control means for controlling the first optical signal adjustment means; and a second optical device including a second control means, wherein the second control means sends, to the first control means, transmitted light information being information relating to a transmitted light signal, and the first control means controls the first optical signal adjustment means in such a way that the transmitted light signal is allowed to pass by using the transmitted light information.

(Supplementary note 2) The optical transmission system according to supplementary note 1, wherein the second control means sends the transmitted light information to the first control means via an optical transmission path through which the transmitted light signal propagates from the first optical device to the second optical device.

(Supplementary note 3) The optical transmission system according to Supplementary note 2, wherein the second optical device further includes a dummy light generation means for generating dummy light, and a light monitor means for monitoring light intensity of received input light for each wavelength, and generating light monitor information, and the second control means includes a storage means being configured in such a way as to store light intensity setting information for compensating an optical transmission characteristic of a submarine optical transmission path to which the second optical device is connected.

(Supplementary note 4) The optical transmission system according to Supplementary note 3, wherein the light monitor means receives the transmitted light signal and the dummy light, and generates first light monitor information being the light monitor information, the second control means sends the first light monitor information and the light intensity setting information to the first control means via the optical transmission path, and the first control means controls the first optical signal adjustment means in such a way that light intensity of the transmitted light signal is made compatible with the light intensity setting information by using the first light monitor information.

(Supplementary note 5) The optical transmission system according to Supplementary note 4, wherein the second control means controls the dummy light generation means in such a way that light intensity of the dummy light is made compatible with the light intensity setting information by using the first light monitor information.

(Supplementary note 6) The optical transmission system according to Supplementary note 3, wherein the second optical device further includes a second optical signal adjustment means being configured in such a way that a first transmitted light signal being the transmitted light signal is received from the first optical device, a second transmitted light signal is received from a third optical device, and light intensity of each of the first transmitted light signal and the second transmitted light signal is adjusted and multiplexed for each wavelength, and the light monitor means receives the first transmitted light signal, the second transmitted light signal, and the dummy light, and generates second light monitor information being the light monitor information, and the second control means controls the second optical signal adjustment means in such a way that light intensity of each of the first transmitted light signal and the second transmitted light signal is made compatible with the light intensity setting information by using the second light monitor information.

(Supplementary note 7) The optical transmission system according to Supplementary note 6, wherein the second control means controls the dummy light generation means in such a way that light intensity of the dummy light is made compatible with the light intensity setting information by using the second light monitor information.

(Supplementary note 8) The optical transmission system according to any one of Supplementary notes 2 to 7, wherein the first optical signal adjustment means includes a first connection port being configured in such a way as to be connected to an optical transponder generating the transmitted light signal; and a second connection port being configured to be connected to the optical transmission path laid in land.

(Supplementary note 9) The optical transmission system according to Supplementary note 6 or 7, wherein the second optical signal adjustment means includes a third connection port being configured in such a way as to be connected to the optical transmission path laid in land, and a fourth connection port being configured in such a way as to be connected to the submarine optical transmission path.

(Supplementary note 10) The optical transmission system according to any one of Supplementary notes 1 to 9, wherein the transmitted light information includes at least a central wavelength and a bandwidth of the transmitted light signal, and a connection port number of the first optical signal adjustment means to which the transmitted light signal is introduced.

(Supplementary note 11) An optical transmission method including: acquiring transmitted light information being information relating to a transmitted light signal; and allowing the transmitted light signal to pass by adjusting light intensity for each wavelength by using the transmitted light information.

(Supplementary note 12) The optical transmission method according to Supplementary note 11, wherein acquiring the transmitted light information includes acquiring the transmitted light information via an optical transmission path through which the transmitted light signal propagates.

(Supplementary note 13) The optical transmission method according to Supplementary note 12, further including: monitoring light intensity of received input light for each wavelength, and generating light monitor information; and holding light intensity setting information for compensating an optical transmission characteristic of a submarine optical transmission path through which the transmitted light signal propagates.

(Supplementary note 14) The optical transmission method according to Supplementary note 13, further including generating dummy light, wherein generating the light monitor information includes receiving the transmitted light signal and the dummy light, and generating first light monitor information being the light monitor information, the optical transmission method further including: acquiring the first light monitor information and the light intensity setting information via the optical transmission path; and making light intensity of the transmitted light signal compatible with the light intensity setting information by using the first light monitor information.

(Supplementary note 15) The optical transmission method according to Supplementary note 14, further including making light intensity of the dummy light compatible with the light intensity setting information by using the first light monitor information.

(Supplementary note 16) The optical transmission method according to Supplementary note 13, further including: generating dummy light; and receiving a first transmitted light signal being the transmitted light signal via the optical transmission path, receiving a second transmitted light signal different from the first transmitted light signal, and adjusting and multiplexing light intensity of each of the first transmitted light signal and the second transmitted light signal for each wavelength, wherein generating the light monitor information includes receiving the first transmitted light signal, the second transmitted light signal, and the dummy light, and generating second light monitor information being the light monitor information, the optical transmission method further including making light intensity of each of the first transmitted light signal and the second transmitted light signal compatible with light intensity setting information by using the second light monitor information.

(Supplementary note 17) The optical transmission method according to Supplementary note 16, further including making light intensity of the dummy light compatible with the light intensity setting information by using the second light monitor information.

(Supplementary note 18) The optical transmission method according to any one of Supplementary notes 12 to 17, wherein allowing the transmitted light signal to pass includes receiving the transmitted light signal from an optical transponder, and sending the transmitted light signal to the optical transmission path laid in land.

(Supplementary note 19) The optical transmission method according to Supplementary note 16 or 17, wherein receiving the first transmitted light signal includes receiving the first transmitted light signal via the optical transmission path laid in land, the optical transmission method further including: generating a multiplexed optical signal in which light intensity of each of the first transmitted light signal and the second transmitted light signal is adjusted and multiplexed for each wavelength; and sending the multiplexed optical signal to the submarine optical transmission path.

(Supplementary note 20) The optical transmission method according to any one of Supplementary notes 11 to 19, wherein the transmitted light information includes at least a central wavelength and a bandwidth of the transmitted light signal.

While the invention has been particularly shown and described with reference to exemplary embodiments thereof, the invention is not limited to these embodiments. It will be understood by those of ordinary skill in the art that various changes in form and details may be made therein without departing from the spirt and scope of the present invention as defined by the claims.

REFERENCE SIGNS LIST

1000, 2000, 2001 Optical transmission system
1100, 2100 First optical device
1110, 2110 First optical signal adjustment unit
1120, 2120 First control unit
1200, 2200, 2201 Second optical device
1210, 2210 Second control unit
2211 Storage unit
2220 Dummy light generation unit
2230 Light monitor unit
2240 Second optical signal adjustment unit
3000 Third optical device
10 Optical transmission path
20 Submarine optical transmission path

What is claimed is:

1. An optical transmission system comprising:
a first optical device including
a first optical signal adjustor including a wavelength selective switch having a bandwidth variable function and an attenuation amount adjustment function, the wavelength selective switch configured to adjust light intensity of an input light signal for each wavelength using the attenuation amount adjustment function, and
a first controller configured to control the first optical signal adjustor; and
a second optical device including a second controller, wherein
the second controller is configured to send, to the first controller, transmitted light information being information relating to a transmitted light signal, and
the first controller is configured to control the first optical signal adjustor in such a way that the transmitted light signal is allowed to pass by using the transmitted light information, wherein
the second controller is configured to send the transmitted light information to the first controller via an optical transmission path through which the transmitted light signal propagates from the first optical device to the second optical device, wherein
the second optical device further includes
a dummy light generator configured to generate dummy light, and
a light monitor configured to monitor light intensity of received input light for each wavelength, and generate light monitor information, and
the second controller includes storage configured to store light intensity setting information for compensating an optical transmission characteristic of a submarine optical transmission path to which the second optical device is connected, and wherein
the second optical device further includes
a second optical signal adjustor including a wavelength selective switch having a bandwidth variable function and an attenuation amount adjustment function, the wavelength selective switch configured to receive a first transmitted light signal being the transmitted light signal from the first optical device, receive a second transmitted light signal from a third optical device, and adjust light intensity of each of the first transmitted light signal and the second transmitted light signal for each wavelength using the attenuation amount adjustment function to multiplex the first transmitted light signal and the second transmitted light signal,
the light monitor is configured to receive the first transmitted light signal, the second transmitted light signal, and the dummy light, and generate second light monitor information being the light monitor information, and
the second controller is configured to control the second optical signal adjustor in such a way that light intensity of each of the first transmitted light signal and the second transmitted light signal is made compatible with the light intensity setting information by using the second light monitor information.

2. The optical transmission system according to claim 1, wherein
the light monitor is configured to receive the transmitted light signal and the dummy light, and generate first light monitor information being the light monitor information,
the second controller is configured to send the first light monitor information and the light intensity setting information to the first controller via the optical transmission path, and
the first controller is configured to control the first optical signal adjustor in such a way that light intensity of the transmitted light signal is made compatible with the light intensity setting information by using the first light monitor information.

3. The optical transmission system according to claim 2, wherein
the second controller is configured to control the dummy light generator in such a way that light intensity of the dummy light is made compatible with the light intensity setting information by using the first light monitor information.

4. The optical transmission system according to claim 1, wherein
the second controller is configured to control the dummy light generator in such a way that light intensity of the dummy light is made compatible with the light intensity setting information by using the second light monitor information.

5. An optical transmission method comprising:
acquiring transmitted light information being information relating to a transmitted light signal; and
allowing the transmitted light signal to pass by adjusting light intensity for each wavelength by using an attenuation amount adjustment function of a wavelength selective switch based on the transmitted light information, wherein
acquiring the transmitted light information includes acquiring the transmitted light information via an optical transmission path through which the transmitted light signal propagates, wherein
monitoring light intensity of received input light for each wavelength, and generating light monitor information; and
holding light intensity setting information for compensating an optical transmission characteristic of a submarine optical transmission path through which the transmitted light signal propagates, wherein generating dummy light; and receiving a first transmitted light signal being the transmitted light signal via the optical transmission path, receiving a second transmitted light signal different from the first transmitted light signal, and adjusting light intensity of each of the first transmitted light signal and the second transmitted light signal for each wavelength using an attenuation amount adjustment function of a wavelength selective switch to multiplex the first transmitted light signal and the second transmitted light signal, wherein generating the light monitor information includes receiving the first transmitted light signal, the second transmitted light signal, and the dummy light, and generating second light monitor information being the light monitor information, and wherein making light intensity of each of the first transmitted light signal and the second transmitted light signal compatible with light intensity setting information by using the second light monitor information.

6. The optical transmission method according to claim 5, further comprising generating dummy light, wherein generating the light monitor information includes receiving the transmitted light signal and the dummy light, and generating first light monitor information being the light monitor information, the optical transmission method further comprising:

acquiring the first light monitor information and the light intensity setting information via the optical transmission path; and making light intensity of the transmitted light signal compatible with the light intensity setting information by using the first light monitor information.

7. The optical transmission method according to claim 6, further comprising making light intensity of the dummy light compatible with the light intensity setting information by using the first light monitor information.

8. The optical transmission method according to claim 5, further comprising making light intensity of the dummy light compatible with the light intensity setting information by using the second light monitor information.

9. The optical transmission method according to claim 5, wherein receiving the first transmitted light signal includes receiving the first transmitted light signal via the optical transmission path laid in land, the optical transmission method further comprising:

generating a multiplexed optical signal in which light intensity of each of the first transmitted light signal and the second transmitted light signal is adjusted and multiplexed for each wavelength; and sending the multiplexed optical signal to the submarine optical transmission path.

10. The optical transmission method according to claim 5, wherein the transmitted light information includes at least a central wavelength and a bandwidth of the transmitted light signal.

* * * * *